(12) United States Patent
Römer

(10) Patent No.: US 10,556,517 B2
(45) Date of Patent: Feb. 11, 2020

(54) FASTENER FOR SWIVEL-MOUNTED MOUNTING OF A SEAT SHELL OF A VEHICLE SEAT AND METHOD FOR SWIVEL-MOUNTED MOUNTING OF A SEAT SHELL ON A VEHICLE SEAT

(71) Applicant: FAURECIA AUTOSITZE GMBH, Stadthagen (DE)

(72) Inventor: Bernd Römer, Stadthagen (DE)

(73) Assignee: FAURECIA AUTOSITZE GMBH, Stadthagen (DE)

( * ) Notice: Subject to any disclaimer, the term of this patent is extended or adjusted under 35 U.S.C. 154(b) by 98 days.

(21) Appl. No.: 15/831,427

(22) Filed: Dec. 5, 2017

(65) Prior Publication Data

US 2018/0154798 A1    Jun. 7, 2018

(30) Foreign Application Priority Data

Dec. 7, 2016 (DE) .................... 10 2016 123 681

(51) Int. Cl.
| | | |
|---|---|---|
| *B60N 2/015* | (2006.01) | |
| *B60N 2/18* | (2006.01) | |
| *B60N 2/68* | (2006.01) | |
| *B60N 2/04* | (2006.01) | |

(52) U.S. Cl.
CPC ......... *B60N 2/01541* (2013.01); *B60N 2/045* (2013.01); *B60N 2/1839* (2013.01); *B60N 2/686* (2013.01)

(58) Field of Classification Search
None
See application file for complete search history.

(56) References Cited

U.S. PATENT DOCUMENTS

| | | |
|---|---|---|
| 3,144,695 A | 8/1964 | Budwig |
| 3,341,903 A | 9/1967 | Buntic |
| 3,632,076 A | 1/1972 | Rogers, Jr. |
| 4,324,414 A | 4/1982 | Wilkes |
| 4,432,525 A | 2/1984 | Duvall |
| 4,500,062 A | 2/1985 | Sandvik |
| 4,515,337 A | 5/1985 | Torras |
| 4,685,730 A | 8/1987 | Linguanotto |
| 4,727,629 A * | 3/1988 | Hoen .............. F16B 5/0635 24/453 |
| 4,869,554 A | 9/1989 | Abu-Isa |
| 4,883,320 A | 11/1989 | Izumida |
| 5,013,086 A | 5/1991 | Benzur |
| 5,368,118 A | 11/1994 | Hoefle |

(Continued)

FOREIGN PATENT DOCUMENTS

| | | |
|---|---|---|
| CA | 2125642 | 12/1994 |
| CN | 1618654 | 5/2005 |

(Continued)

OTHER PUBLICATIONS

Office Action dated Feb. 15, 2019 for U.S. Appl. No. 15/856,341 (pp. 1-10).

(Continued)

*Primary Examiner* — David E Allred
(74) *Attorney, Agent, or Firm* — Barnes & Thornburg LLP

(57) ABSTRACT

A vehicle seat includes a seating portion and a seat shell coupled to the seat portion to swivel. The seat shell is coupled to the seating portion by a fastener.

15 Claims, 3 Drawing Sheets

(56) References Cited

U.S. PATENT DOCUMENTS

| | | |
|---|---|---|
| 5,393,126 A | 2/1995 | Boulva |
| 5,558,399 A | 9/1996 | Serber |
| 5,582,381 A | 12/1996 | Graf |
| 5,769,490 A | 6/1998 | Falzon |
| 5,921,605 A * | 7/1999 | Musukula ............ B60N 2/0224 296/63 |
| 5,976,097 A | 11/1999 | Jensen |
| 5,992,933 A | 11/1999 | West |
| 6,068,280 A | 5/2000 | Torres |
| 6,793,289 B2 | 9/2004 | Kuster |
| 6,814,407 B2 | 11/2004 | Mundell |
| 7,044,553 B2 | 5/2006 | Ropp |
| 7,063,386 B2 | 6/2006 | Dowty |
| 7,083,233 B2 | 8/2006 | Massara |
| 7,281,749 B2 | 10/2007 | Yamada |
| 7,334,758 B2 | 2/2008 | Williamson |
| 7,338,126 B2 | 3/2008 | Ropp |
| 7,481,493 B2 | 1/2009 | Fujita |
| 7,490,572 B2 | 2/2009 | Grober |
| 7,506,910 B2 | 3/2009 | Leitner |
| 7,517,024 B2 | 4/2009 | Cvek |
| 7,575,206 B2 | 8/2009 | Meier |
| 7,722,526 B2 | 5/2010 | Kim |
| 7,731,294 B2 | 6/2010 | Yasuda |
| 7,841,662 B2 | 11/2010 | Samain |
| 7,971,939 B2 | 7/2011 | Fujita |
| 8,020,933 B2 | 9/2011 | Kim |
| 8,100,471 B2 | 1/2012 | Lawall |
| 8,340,869 B2 | 12/2012 | Wakita |
| 8,662,585 B2 | 3/2014 | Garvis |
| 8,684,460 B2 | 4/2014 | Weir, III |
| 8,690,750 B2 | 4/2014 | Krueger |
| 8,840,186 B2 | 9/2014 | Samain |
| 8,911,015 B2 | 12/2014 | Cohen |
| 9,045,058 B2 | 6/2015 | Katoh |
| 9,193,280 B2 | 11/2015 | McMillen |
| 9,193,287 B2 | 11/2015 | McMillen |
| 9,242,581 B2 | 1/2016 | Farooq |
| 9,272,643 B2 | 3/2016 | Nagayasu |
| 9,428,083 B2 | 8/2016 | Lehner |
| 9,494,940 B1 | 11/2016 | Kentley |
| 9,517,777 B2 | 12/2016 | Hall |
| 9,550,440 B2 | 1/2017 | Nagayasu |
| 9,561,741 B2 | 2/2017 | Nagayasu |
| 9,604,560 B1 | 3/2017 | Ellis |
| 9,682,682 B2 | 6/2017 | Aoki |
| 9,713,380 B2 | 7/2017 | Gehner |
| 9,751,434 B2 | 9/2017 | Sugiyama |
| 9,802,513 B2 | 10/2017 | Katoh |
| 9,950,646 B2 | 4/2018 | Katoh |
| 9,975,458 B2 | 5/2018 | Takeuchi |
| 2001/0029621 A1 * | 10/2001 | Howland ............ A41D 13/05 2/2.5 |
| 2002/0060493 A1 | 5/2002 | Nishino |
| 2002/0135214 A1 | 9/2002 | Ursel |
| 2003/0116999 A1 | 6/2003 | Fujita |
| 2004/0245824 A1 | 12/2004 | McMillen |
| 2005/0179294 A1 | 8/2005 | Dowty |
| 2006/0055214 A1 | 3/2006 | Serber |
| 2006/0138831 A1 | 6/2006 | McMillen |
| 2006/0191114 A1 * | 8/2006 | Yu ..................... F16B 5/0642 24/458 |
| 2007/0080013 A1 | 4/2007 | Melz |
| 2008/0023995 A1 | 1/2008 | Ott |
| 2009/0115234 A1 | 5/2009 | Samain |
| 2009/0188698 A1 * | 7/2009 | Cloutier ................ H01B 17/10 174/172 |
| 2010/0050923 A1 * | 3/2010 | Lemons ................ B63B 17/02 114/361 |
| 2010/0268133 A1 | 10/2010 | Samain |
| 2011/0099773 A1 * | 5/2011 | Golden ................ A61B 1/0014 24/457 |
| 2013/0006478 A1 | 1/2013 | Lin |
| 2013/0175838 A1 | 7/2013 | Oshima |
| 2015/0105641 A1 | 4/2015 | Austin |
| 2015/0266448 A1 | 9/2015 | Aoki |
| 2015/0343924 A1 | 12/2015 | Takeuchi |
| 2016/0096450 A1 | 4/2016 | Kondrad |
| 2016/0159254 A1 | 6/2016 | Katoh |
| 2016/0243967 A1 | 8/2016 | Seibold |
| 2017/0129373 A1 | 5/2017 | Knox |
| 2018/0222518 A1 | 8/2018 | Hill |

FOREIGN PATENT DOCUMENTS

| | | |
|---|---|---|
| CN | 101274604 | 10/2008 |
| CN | 104758153 | 7/2015 |
| DE | 10041910 | 1/2002 |
| DE | 102004058503 | 1/2006 |
| DE | 102009048902 | 4/2011 |
| DE | 102011109470 | 2/2012 |
| DE | 102011009211 A1 | 7/2012 |
| DE | 102015117980 | 5/2016 |
| EP | 0185388 A1 | 6/1986 |
| EP | 1193117 | 4/2002 |
| EP | 1663727 | 6/2006 |
| FR | 2061931 | 6/1971 |
| FR | 2776583 | 10/1999 |
| GB | 1330683 A | 9/1973 |
| GB | 8816607 | 8/1988 |
| GB | 2206787 | 1/1989 |
| GB | 2206787 B | 1/1989 |
| GB | 2407028 | 4/2005 |
| GB | 201307595 | 6/2013 |
| JP | 2003299231 A | 10/2003 |
| WO | 2004026080 | 4/2004 |
| WO | 2005025945 | 3/2005 |
| WO | 2005037020 | 4/2005 |
| WO | 2005094632 | 10/2005 |
| WO | 2006083158 | 8/2006 |
| WO | 2006095455 A1 | 9/2006 |
| WO | 2016197068 | 12/2016 |

OTHER PUBLICATIONS

Extended European Search Report for European App. No. 17206306.7 dated May 14, 2018, 4175 EP II, 5 pages.

Office Action dated Apr. 19, 2019 for U.S. Appl. No. 15/852,010, 4552 US-U II, pp. 1-6.

German Office Action for German App. No. 10 2016 123 681.0 dated Oct. 19, 2017, 601-666 DE, 5 pages, (no English translation available).

Office Action dated Nov. 7, 2019 for U.S. Appl. No. 15/846,342, (pp. 1-6).

\* cited by examiner

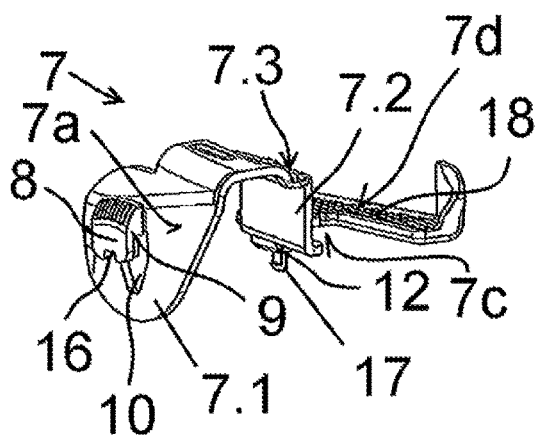
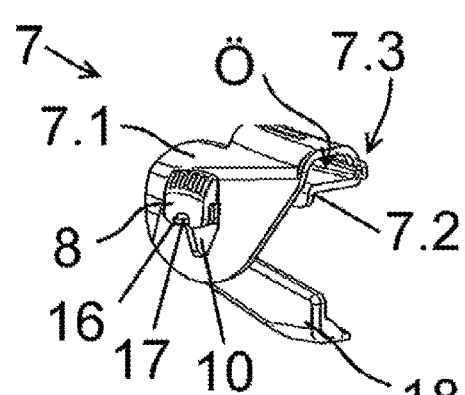
Fig. 8a
Fig. 9a
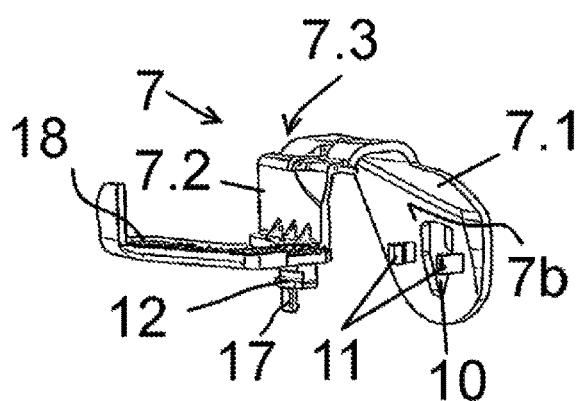
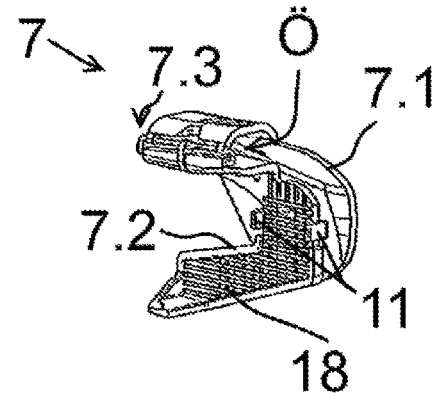
Fig. 8b
Fig. 9b
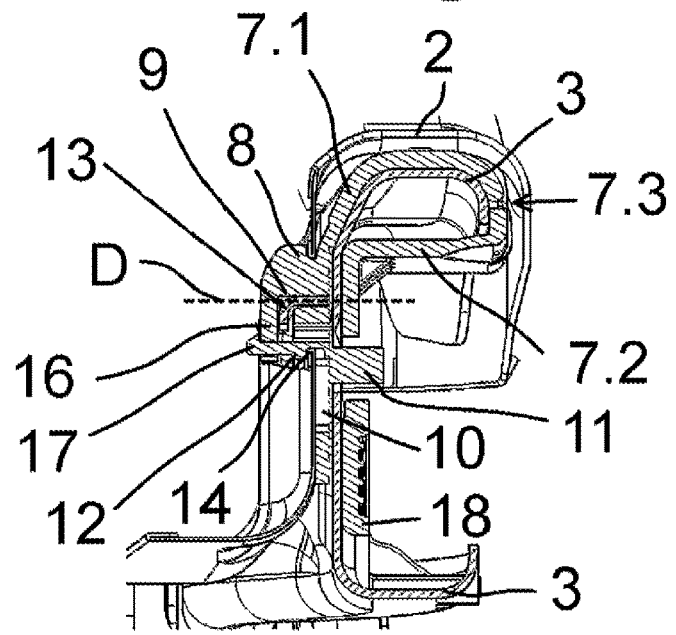
Fig. 10

FASTENER FOR SWIVEL-MOUNTED MOUNTING OF A SEAT SHELL OF A VEHICLE SEAT AND METHOD FOR SWIVEL-MOUNTED MOUNTING OF A SEAT SHELL ON A VEHICLE SEAT

PRIORITY CLAIM

This application claims priority under 35 U.S.C. § 119b to German Patent Application No. 10 2016 123 681.0, filed Dec. 7, 2016, which is expressly incorporated by reference herein.

BACKGROUND

The present disclosure relates to a fastener, and particularly to a fastener used in a vehicle seat. More particularly, the present disclosure relates to a swivel-mounted fastener for use in a vehicle seat.

SUMMARY

According to the present disclosure, a vehicle seat includes a seating portion and a seat shell. The seat shell is coupled to the seating portion to swivel relative to the seating portion.

In illustrative embodiments, a monolithic fastener is arranged to couple the seat shell to the seating portion to allow the seat shell to swivel relative to the seating portion. The seat shell is coupled to the seating portion for swiveled movement relative to the seating portion when the monolithic fastener is in a closed position. The monolithic fastener includes a first area, a second area, and a flexible transition arranged to extend between and interconnect the first and second areas. The monolithic fastener is arranged to extend around a portion of the seat shell when the monolithic fastener is in the closed position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 8a is a perspective view of another embodiment of a fastener in accordance with the present disclosure showing the fastener in an open position;

FIG. 8b is a different perspective view of the fastener of FIG. 8a;

FIG. 9a is a perspective view of the fastener of FIG. 8a showing the fastener in a closed arrangement;

FIG. 9b is a different perspective view of the fastener of FIG. 9a; and

FIG. 10 is a sectional view of the mounted fastener according to FIGS. 8a-9b.

DETAILED DESCRIPTION

Figure 1:
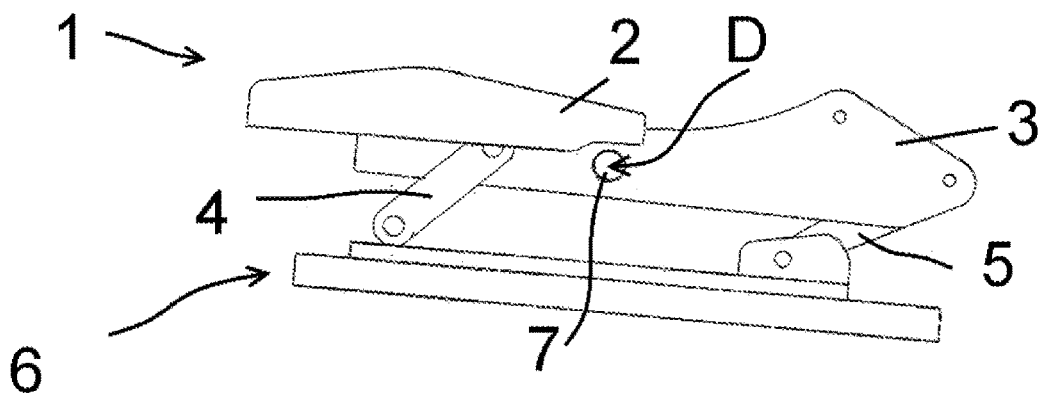
FIG. 1 is a side elevation view of a portion of a vehicle seat in accordance with the present disclosure.
Figures 2A, 3A:
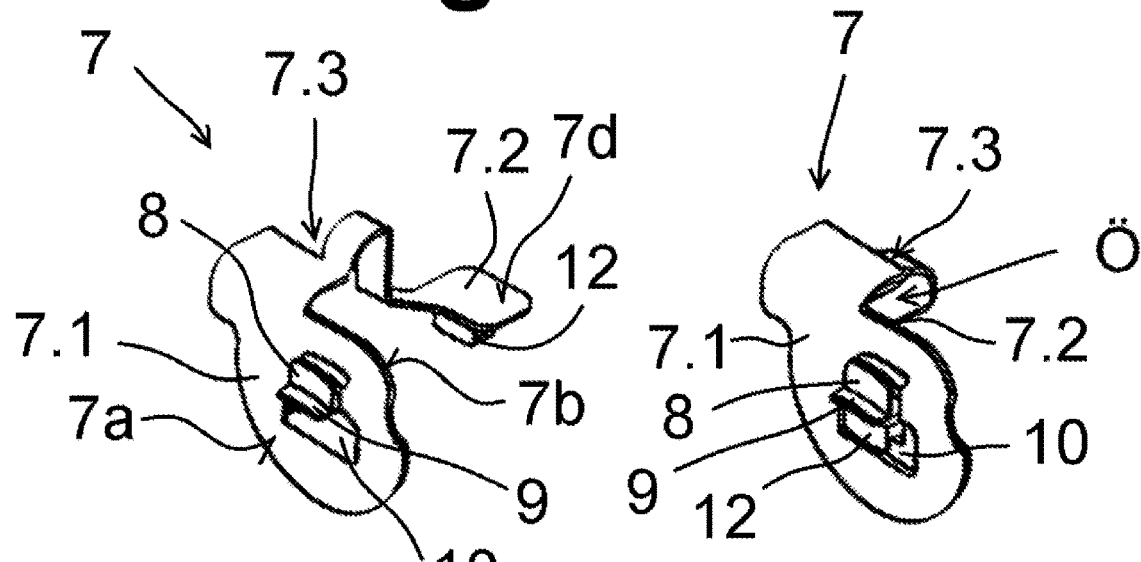
FIG. 2a is a perspective view of a first embodiment of a fastener in an open position.
FIG. 3a is a view similar to FIG. 2a showing the fastener in a closed position.
Figures 2B, 3B:
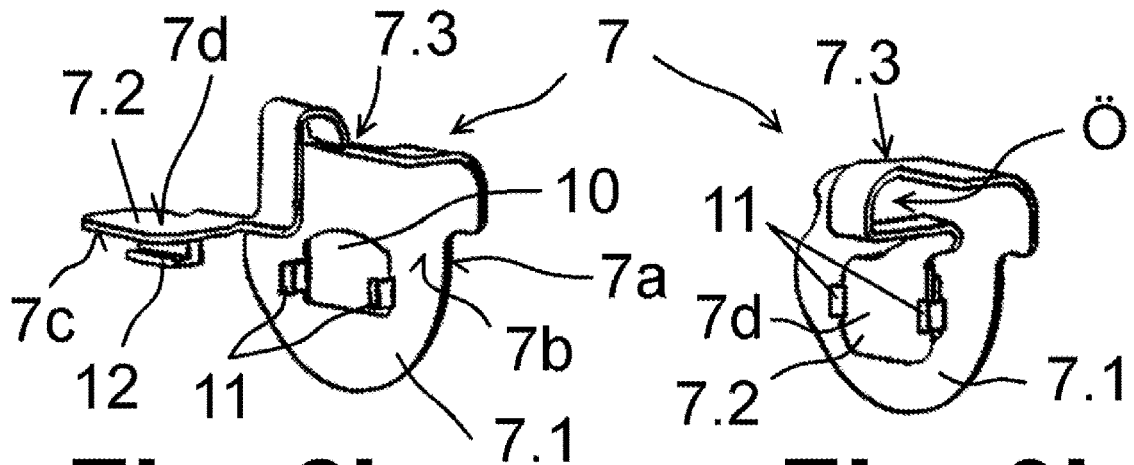
FIG. 2b is a perspective view of a second embodiment of a fastener in an open position.
FIG. 3b is a view similar to FIG. 2b showing the fastener in a closed position.
Figure 4:
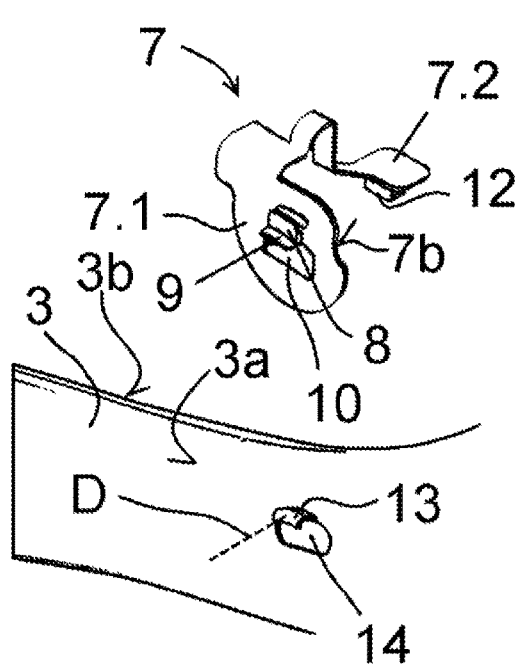
FIG. 4 is a partial perspective view showing assembly of a fastener in accordance with the present disclosure on a component affixed to a seating portion.
Figure 5:
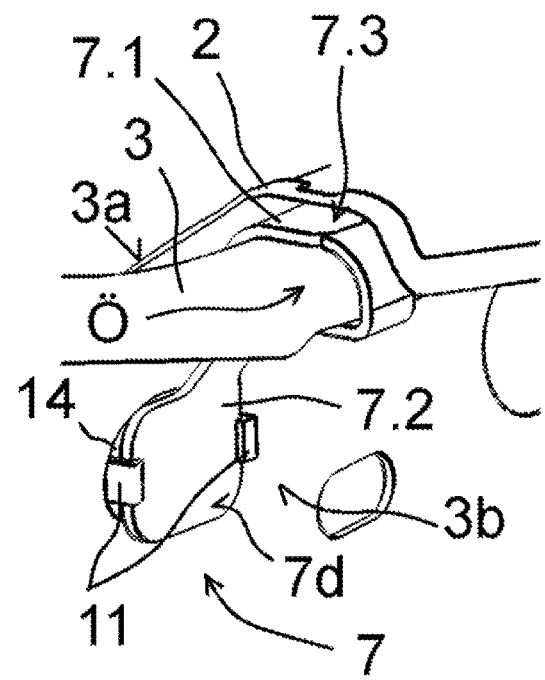
FIG. 5 is a view showing fastener mounted on the vehicle seat.
Figure 6:
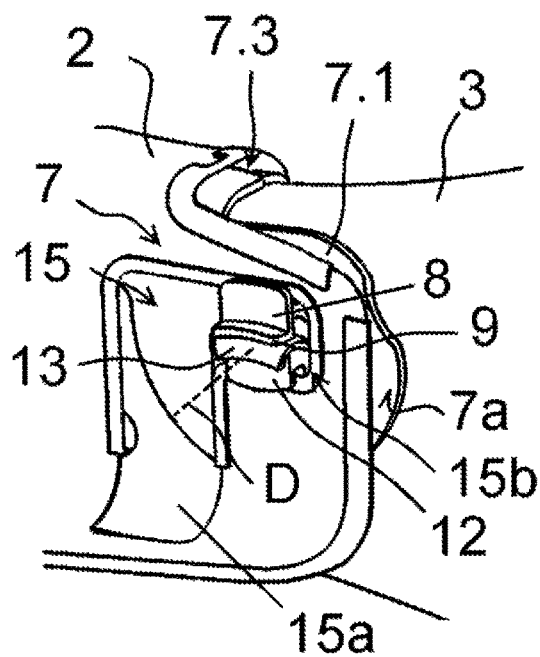
FIG. 6 is a view showing the fastener mounted on the vehicle seat.
Figure 7:
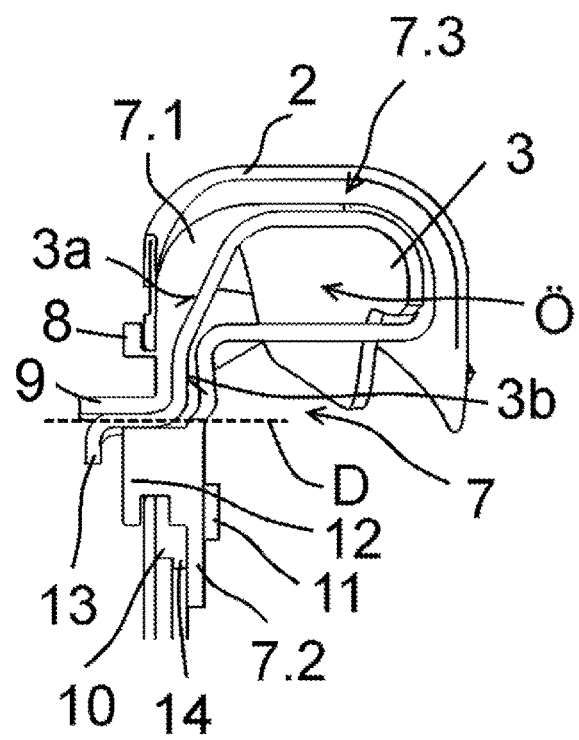
FIG. 7 is a sectional view of the mounted fastener according to FIG. 5 and FIG. 6.

A fastener 7 for swivel-mounted mounting of a seat shell 2 on a vehicle seat 1, comprising a first area 7.1 and a second area 7.2. The first area 7.1 and the second area 7.2 are flexibly joined in a transition area 7.3. The first area 7.1 comprising a first hook element 8 and an opening 10 and a second hook element 12 being disposed on the second area 7.2 and the first area 7.1 being transferrable in relation to the second area 7.2 into a closed position by means of the flexible connection in the transition area 7.3. When in the closed position, the second hook element 12 protrudes through the opening 10 in the first area 7.1 and the first and the second hook element 8, 12 are disposed adjacent and aligned in relation to each other such that the second hook elements 8, 12 may embrace an insertion opening 15 of the seat shell 2 in a hooked manner for swivel-mounted holding of the seat shell 2, and, at the same time, a component affixed to the seating portion 3 may be enclosed, at least in part, by the two areas 7.1, 7.2 of the fastener 7 in a looped manner for holding the fastener 7 on the component affixed to the seating portion 3.

Projections 11 of fastener 7 are disposed adjacent the opening 10 in the first area 7.1 of the fastener 7. The projections embracing the second area 7.2 in the closed position for securely holding the second area 7.1 to the first area 7.2 and thereby for securely affixing the fastener 7 to the component affixed to the seating portion 3. In one example, fastener 7 is designed as one piece and the first area 7.1 is joined with the second area 7.2 via an elastically designed transition area 7.3.

A support region 9 is disposed on the first hook element 8 for supporting the first hook element 8 on an edge 13 of the component affixed to the seating portion 3.

A receptacle 16 is disposed on the first hook element 8 and a third hook element 17 is disposed on the second hook element 12. The third hook element 17 in the closed position of the fastener 7 engages with the receptacle 16 for additionally holding the fastener 7 in the closed position. In one example, fastener 7 is designed as a pressure die-casting component made of plastics.

Fastener 7 comprises a support region 18 on the second area 7.2 for improving stability in the closed position. The hook elements 8, 12 open towards opposite sides in the closed position.

Vehicle seat 1 comprises a swivel-mounted seat shell 2 and a component affixed to the seating portion 3. The seat shell 2 is mounted swivellingly on the component affixed to the seating portion 3 of the vehicle seat 1 via the fastener 7. The fastener 7 enclosing, at least in part, by means of the first and the second area 7.1, 7.2 the component affixed to the seating portion 3 for holding the fastener 7 on the component affixed to the seating portion 3. The second hook element 12 protrudes through the opening 10 in the first area 7.1 whereby the first hook element 8 and the second hook element 12 are aligned adjacent each other in such a manner that both hook elements 8, 12 encompass an insertion opening 15 in the seat shell 2 thereby holding the seat shell 2 on the component affixed to the seating portion 3 in a manner swiveling about a rotational axis D.

The opening 10 is aligned with a recess 14 in the component affixed to the seating portion 3. As a result, the second hook element 12 protrudes through the opening 10 and the recess 14 and the projections 11 through the recess 14. An edge 13 is disposed adjacent to the recess 14 on which the first hook element 8 is supported at its support region 9 and to which the second hook element 12 is adjacent in the closed position, whereby the rotational axis D is defined by the recess 14.

The first area 7.1 and the hook elements 8, 12 are disposed on a first component surface 3a of the component affixed to the seating portion 3 and the second area 7.2 on a second component surface 3b of the component affixed to the seating portion 3 opposite the first component surface 3a.

The hook elements 8, 12 open away from the rotational axis D and in a differing direction. In one example, hook elements 8, 12 are oriented generally perpendicular to the rotational axis D thereby encompassing the insertion opening 15 so as to block removal of the seat shell 2 in the axial direction relative to the rotational axis D.

A method for swivel-mounted mounting of a seat shell 2 on a component affixed to the seating portion 3 using a fastener 7 includes the following steps. Bringing the fastener 7 in contact with the component affixed to the seating portion 3 by placing the first area 7.1 of the fastener 7 in the open position onto a first component surface 3a of the component affixed to the seating portion 3. The opening 10 aligns with the recess 14 and, subsequently, the second area 7.2 is placed around the component affixed to the seating portion 3 in such a manner that the second hook element 12 protrudes through the opening 10 so that it lies adjacent to the first hook element 8. Affixing the seat shell 2, by positioning the seat shell 2 at a first insertion area 15a of the insertion opening 15 in such a way that the adjacent hook elements 8, 12 protrude through the first insertion area 15a and, subsequently, the seat shell 2 is slid, guided by the insertion opening 15, such that the hook elements 8, 12 come to be in a second insertion area 15b of the insertion opening 15. Whereby the hook elements 8, 12 encompass the insertion opening 15 in the second insertion area 15b in a hooked manner so as to enable swiveling of the seat shell 2 and prevent axial shifting in the direction of the rotational axis D.

After the fastener 7 has been brought into contact with the component affixed to the seating portion 3, the fastener 7 is additionally affixed by means of the projections 11 in that the projections 11 enclose the second area 7.2 and/or the third hook element 17 engages with the receptacle 16 on the first hook element 8.

Swivel-mounted mounting of a seat shell of a vehicle seat may be done using multi-piece fasteners. The multi-piece fasteners penetrate the seat shell as well as a component affixed to the seating portion in the area of a rotational axis. In one example, the multi-piece fasteners are a screw having a thread as well as correspondingly screwed on nut which may be rotated in relation to each other for fixation. In another example, plug-in fasteners may be provided which are plugged into each other from both sides for fixation thereby swivellingly holding the seat shell on the component affixed to the seating portion. In another example, a rivet may be used as a fastener which is riveted into the material. The fasteners may comprise various spacers in order to attain a certain position of the seat shell relative to the component affixed to the seating portion.

Multi-piece fasteners use increased materials, and thus, have higher material costs as well as increased mounting effort. Mounting effort may be further increased when multi-piece fasteners are mounted one after another in series. Disassembly using multi-piece fasteners may be more difficult.

A fastener for swivel-mounted mounting of a seat shell of a vehicle seat which allows the seat shell to be affixed securely to the vehicle seat using only a minimal number of components. A fastener comprises a first area and a second area which are flexibly joined. When the two areas are transitioned in relation to each other into a closed position, e.g. folded, then a second hook element arranged on the second area moves through an opening in the first area thereby creating, by means of both areas, a type of loop or closed band respectively. When in the closed position, the two areas may enclose, at least in part, a component of the vehicle seat affixed to the seating portion so that the fastener is held on the component affixed to the seating portion.

For swivel-mounted mounting of a seat shell on the fastener held on the component affixed to the seating portion, on the first area of the fastener a first hook element is arranged which, in the closed position, lies adjacent to the second hook element which protrudes through the opening. Hereby, the two adjacent hook elements are aligned in relation to each other and designed in a hook-like manner such that they may each embrace an insertion opening in the seat shell to thereby hold or, respectively, bear the seat shell in a swivel-mounted manner.

The adjacent hook elements allows rotation of the seat shell about an axis of rotation while, at the same time, owing to their embrace of the insertion opening, blocking axial displacement of the seat shell along the axis of rotation. To that end the hook elements may be oriented e.g. each opening perpendicular in relation to the rotational axis and facing in the opposite direction so that the hook elements embrace the insertion opening of the seat shell at different sides. In one example, the hook elements embrace the insertion opening of the seat shell at opposite side.

In accordance with the present disclosure, a one-piece fastener, also called a monolithic fastener, allows affixing onto a component affixed to the seating portion by means of embracing and, moreover, by means of the hook elements, the swivel-mounted mounting of the seat shell thereby attaining a swivel-mounted fixation of also the seat shell on the component affixed to the seating portion. The fastener is designed as a pressure die-casting component comprising an elastic transition area between the two areas which allows elastic adjustment of the two areas in relation to each other in order to convert easily the fastener from an open position into a closed position upon assembly and the other way around upon disassembly. In another example, a hinge-type connection may be provided.

At the same time, the first and/or the second area may act as spacer so that by choosing a thickness of the first and/or the second area, a spacing between the seat shell and the component affixed to the seating portion may be defined. As a result, swiveling properties of the seat shell may be maximized.

Adjacent to the opening in the first area are projections which are arranged which embrace the second are in the closed position, i.e. when the second hook element protrudes through the opening, so that the first and the second area are held together in the closed position and the continuous band created by means of the two areas stays firmly closed and the fastener is held securely attached to the component affixed to the seating portion.

The projections are not required as the fastener may be held on the component affixed to the seating portion even when the hook elements are held together by embracing the insertion opening. Thus, in this case, the hook elements alone make the two areas stay closed thereby creating a certain fixation. However, the projections may provide, in case of higher load or e.g. upon assembly or disassembly, that any accidental displacement of the fastener is limited.

A support area projecting away is disposed on the first hook element which supports the first hook element on an edge on the component affixed to the seating portion when the fastener is mounted on the vehicle seat so that the rotational axis about which the seat shell pivots can be stabilized.

A receptacle may be provided on the first hook element and a third hook element may be provided on the second hook element. In the closed position of the fastener in which the first and second hook elements lied adjacent each other the third hook element engages with the receptacle on the first hook element so as to block detachment of the fastener because the two hook elements are being held together. This helps to further secure the fixation of the fastener.

Moreover, on the second area a contact area may be provided prolonging the second area which in the closed position lies flush with the component affixed to the seating portion thereby creating more stability during swivel-mounted mounting of the seat shell in operation of the vehicle seat.

To enable the partially embracing fixation of the fastener on the component affixed to the seating portion, a recess is disposed in the component affixed to the seating portion which is aligned with the opening in the fastener so that the second hook element may be pushed through the recess and the opening comes to lie adjacent the first hook element there. Disposed on the recess, e.g. above it is the edge so that the first hook element can rest upon it with its contact area and the second hook element lies below the edge. In this embodiment the rotational axis is approximately defined by the edge, i.e. the seat shell rotates approximately about the edge as center point.

As a method for creating the swivel-mounted mounting of the seat shell on the component affixed to the seating portion it is provided, firstly, to bring the fastener in contact with the component affixed to the seating portion and to embrace this so as to create a type of loop surrounding, at least in part, the component affixed to the seating portion and so that the hook elements lie adjacent each other. Subsequently, the seat shell is placed at a first insertion area of the insertion opening on the adjacent hook elements. Thereafter, the seat shell is positioned such that the hook elements are shifted from the first insertion area to a second insertion area. In this second insertion area both hook elements embrace the insertion opening such that axial displacement of the seat shell along the rotational axis is prevented. Owing to the hook shape of the hook elements it is possible to pivot the seat shell.

A simple method for swivel-mounted mounting is specified which also allows simple disassembly. To that end only a few manual maneuvers without any additional tools are required to provide secure fixation.

The invention claimed is:

1. A fastener for swivel-mounted mounting of a seat shell on a vehicle seat, the fastener comprising
a first area and
a second area,
wherein the first area and the second area are joined flexibly in a transition area, the first area comprises a first hook element and an opening and a second hook element being disposed on the second area the first hook element comprising a first hook portion and the second hook element comprising a second hook portion, the first area is movable in relation to the second area into a closed position by the flexible connection in the transition area, whereby in the closed position the second hook element protrudes through the opening in the first area and the first and the second hook elements are disposed proximate and aligned in relation to each other such that the first and second hook elements form opposing sides of a journal embraced by an insertion opening formed in the seat shell the first and second hook portions protrude radially outward from the opposite sides in a hooked manner for swivel-mounted holding of the seat shell, and, at the same time, a component affixed to a seating portion of the vehicle seat is enclosed, at least in part, by the first and second areas in a looped manner for holding the fastener on the component affixed to the seating portion.

2. The fastener of claim 1, wherein projections are disposed adjacent the opening in the first area of the fastener, the projections embracing the second area in the closed position for holding securely the second area to the first area and thereby for affixing securely the fastener to the component affixed to the seating portion.

3. The fastener of claim 2, wherein the fastener is one piece and the first area is joined with the second area via an elastic transition area.

4. The fastener of claim 3, wherein a support region is disposed on the first hook element and is configured to support the first hook element on an edge of the component affixed to the seating portion.

5. The fastener of claim 4, wherein a receptacle is disposed on the first hook element and a third hook element is disposed on the second hook element, the third hook element in the closed position of the fastener engages with the receptacle to hold the fastener in the closed position.

6. The fastener of claim 5, wherein the fastener is made as a pressure die-casting component made of plastics.

7. The fastener of claim 6, wherein the fastener further comprises a support region on the second area that is configured to improve stability when the fastener is in the closed position.

8. A vehicle seat comprising
a swivel-mounted seat shell,
a seating portion, and
a component coupled to the seating portion,
wherein the seat shell is mounted to swivel on the component by a fastener,
wherein fastener includes a first area and a second area, the first area and the second area are joined flexibly in a transition area, the first area comprises a first hook element and an opening and a second hook element being disposed on the second area, the first hook element comprising a first hook portion and the second hook element comprising a second hook portion, the first area is movable in relation to the second area into a closed position by the flexible connection in the transition area, whereby in the closed position the second hook element protrudes through the opening in the first area and the first and the second hook elements are disposed proximate and aligned in relation to each other such that the first and second hook elements form opposing sides of a journal embraced by an insertion opening formed in the seat shell and the first and second hook portions engage edges of the insertion opening in a hooked manner for swivel-mounted holding of the seat shell, and, at the same time, the component coupled to the seating portion is enclosed, at least in part, by the first and second areas in a looped manner for holding the fastener on the component coupled to the seating portion, wherein the first and second areas cooperate to enclose the component, and wherein both hook elements encompass an interior edge of a portion of the shell defining the insertion opening in the seat shell to cause the seat shell to be rotatably coupled to the component to swivel about a rotational axis.

9. The vehicle seat of claim 8, wherein projections are disposed adjacent the opening in the first area of the fastener, the projections embracing the second area in the closed position for holding securely the second area to the first area and thereby for affixing securely the fastener to the component.

10. The vehicle seat of claim 9, wherein the transition area is elastic, the fastener is one piece and the first area is joined with the second area via the elastic transition area.

11. The vehicle seat of claim 10, wherein a support region is disposed on the first hook element and is configured to support the first hook element on an edge of the component coupled to the seating portion.

12. The vehicle seat of claim 8, wherein the opening is aligned with a recess formed in the component so that the second hook element protrudes through the opening and the recess and the projections protrude in a direction away from the recess.

13. The vehicle seat of claim 12, wherein an edge is disposed adjacent to the recess, on which the first hook element is supported at a support region and to which the second hook element is adjacent in the closed position, whereby the rotational axis is defined in part by the recess.

14. The vehicle seat of claim 13, wherein the hook elements are disposed on a first component surface of the component and the second area on a second component surface of the component is coupled to the seating portion opposite the first component surface.

15. The vehicle seat of claim 14, wherein the hook elements open away from the rotational axis with the hook portions projecting generally perpendicular to the rotational axis thereby encompassing an interior edge of a portion of the shell defining the the insertion opening so as to block removal of the seat shell in the axial direction relative to the rotational axis.

* * * * *